(12) United States Patent
Chen et al.

(10) Patent No.: US 11,888,116 B2
(45) Date of Patent: Jan. 30, 2024

(54) FAST CHARGE LONG-LIFETIME SECONDARY BATTERY, BATTERY MODULE, BATTERY PACK, AND POWER CONSUMPTION DEVICE

(71) Applicant: Contemporary Amperex Technology Co., Limited, Ningde (CN)

(72) Inventors: Peipei Chen, Ningde (CN); Chang Peng, Ningde (CN); Hailin Zou, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 0 days.

(21) Appl. No.: 17/930,420

(22) Filed: Sep. 8, 2022

(65) Prior Publication Data
US 2023/0091618 A1     Mar. 23, 2023

Related U.S. Application Data

(63) Continuation of application No. PCT/CN2021/119110, filed on Sep. 17, 2021.

(51) Int. Cl.
*H01M 10/0525*     (2010.01)
*H01M 10/0567*     (2010.01)
(Continued)

(52) U.S. Cl.
CPC ... *H01M 10/0567* (2013.01); *H01M 10/0525* (2013.01); *H01M 10/0568* (2013.01); *H01M 50/534* (2021.01); *H01M 2220/20* (2013.01)

(58) Field of Classification Search
CPC ......... H01M 10/0525; H01M 10/0567; H01M 10/0568; H01M 50/534; H01M 2220/20
See application file for complete search history.

(56) References Cited

U.S. PATENT DOCUMENTS

| | | | |
|---|---|---|---|
| 2016/0027592 A1* | 1/2016 | Shimamoto | H01G 11/60 429/188 |
| 2016/0164096 A1* | 6/2016 | Yokotsuji | H01M 4/364 429/188 |

(Continued)

FOREIGN PATENT DOCUMENTS

| | | |
|---|---|---|
| CN | 100433440 C | 11/2008 |
| CN | 105830271 A | 8/2016 |

(Continued)

OTHER PUBLICATIONS

International Search Report received in PCT Application PCT/CN2021/119110 dated Mar. 3, 2022.

(Continued)

*Primary Examiner* — Osei K Amponsah
(74) *Attorney, Agent, or Firm* — Kilpatrick Townsend & Stockton LLP

(57) ABSTRACT

The present disclosure provides a fast charge long lifetime secondary battery, a battery module, a battery pack, and a power consumption device. In some embodiments, a secondary battery, comprising an electrode assembly and an electrolytic solution, the electrode assembly comprises a positive electrode plate, a negative electrode plate, and a separator, the positive electrode plate comprises a positive electrode tab, and the negative electrode plate comprises a negative electrode tab are provided. In those embodiments, the positive electrode tab has the following temperature rise coefficient:

$$\alpha = \frac{C}{10\sqrt{S1}}$$

where S1 is a total cross-sectional area of the positive electrode tab, in unit of mm$^2$; C is capacity of the electrode (Continued)

assembly, in unit of A·h; the electrolytic solution contains a heat stable salt and an additive that inhibits decomposition of the lithium salt.

19 Claims, 2 Drawing Sheets

(51) Int. Cl.
*H01M 50/534* (2021.01)
*H01M 10/0568* (2010.01)

(56) References Cited

U.S. PATENT DOCUMENTS

| | | |
|---|---|---|
| 2016/0315351 A1 | 10/2016 | Kotou et al. |
| 2020/0052332 A1 | 2/2020 | Yi et al. |
| 2020/0243911 A1* | 7/2020 | Kuwajima ............. H01G 11/64 |
| 2020/0335823 A1 | 10/2020 | Takahashi et al. |

FOREIGN PATENT DOCUMENTS

| | | |
|---|---|---|
| JP | 2018035059 A | 3/2018 |
| JP | 2019040721 A | 3/2019 |
| JP | 2019040722 A | 3/2019 |
| KR | 20160100964 A | 8/2016 |
| WO | 2014163055 A1 | 10/2014 |
| WO | 1019031315 A1 | 2/2019 |

OTHER PUBLICATIONS

Written Opinion received in PCT Application PCT/CN2021/119110 dated Mar. 3, 2022.
Decision to Grant a Patent received in the corresponding Korean Application 10-2022-7030635 dated May 15, 2023.
First office action received in the corresponding Korean Application 10-2022-7030635 dated Jan. 3, 2023.
Notice of Reasons for Refusal received in the corresponding Japanese Application 2022-57637, dated Nov. 7, 2023.

* cited by examiner

FAST CHARGE LONG-LIFETIME SECONDARY BATTERY, BATTERY MODULE, BATTERY PACK, AND POWER CONSUMPTION DEVICE

CROSS-REFERENCE TO RELATED APPLICATIONS

The present application is a continuation of International Application PCT/CN2021/119110, filed Sep. 17, 2021 and entitled "FAST CHARGE LONG-LIFETIME SECONDARY BATTERY, BATTERY MODULE, BATTERY PACK, AND POWER CONSUMPTION DEVICE", the entire content of which is incorporated herein by reference.

TECHNICAL FIELD

The present disclosure relates to the technical field of batteries, and in particular, to a fast charge long-lifetime secondary battery, a battery module, a battery pack, and a power consumption device.

BACKGROUND ART

The lithium-ion batteries are widely applied in various fields such as new-energy vehicles and energy storage power stations due to the advantages such as high energy density, long lifetime, and energy saving and environmental friendliness. With the accelerated pace of life and the development of electronic products, consumers more urgently need to shorten the charge time and increase the discharge power of the lithium-ion batteries, i.e. to increase the C-rate of the batteries. However, increasing the C-rate of the batteries will cause significant increase in temperature rise coefficient at the tab inside the battery core, further lead to relatively high temperature rise at the tab, and cause accelerated decomposition of the electrolytic solution around the tab into high active substances such as HF and $PF_5$, not only resulting in a decreased content of lithium salts, but also further damaging SEI and speeding up the consumption of the electrolytic solution. This will lead to an insufficient electrolytic solution content, insufficient dynamics of the battery core, and corresponding rapid increase in SEI impedance after the battery core has been cycled for a period of time, and finally result in deterioration of power and performances of the battery core after the cycling, which is manifested by rapid increase in internal resistance of the battery core. Besides, with the consumers' demand for high-energy-density battery cores, the current at the tab of the battery core is larger when charging and discharging at the same rate, further resulting in a larger temperature rise coefficient of the tab.

SUMMARY

The present disclosure is carried out in view of the above subjects, and one of the objectives is to provide a fast charge long-lifetime secondary battery, which still can maintain relatively high power and performances in middle and later stages of the cycle.

In order to achieve the above objectives, the present disclosure provides a secondary battery, a battery module containing the secondary battery, a battery pack containing the battery module, and a power consumption device containing the secondary battery, the battery module or the battery pack.

In a first aspect, the present disclosure provides a secondary battery, including an electrode assembly and an electrolytic solution, the electrode assembly including a positive electrode plate, a negative electrode plate, and a separator, the positive electrode plate including a positive electrode tab, and the negative electrode plate including a negative electrode tab, wherein the positive electrode tab has the following temperature rise coefficient α A·h/mm:

$$\alpha = \frac{C}{10\sqrt{S1}}$$

where S1 is a total cross-sectional area of the positive electrode tab, in unit of $mm^2$; C is capacity of the electrode assembly, in unit of A·h (ampere-hour);

the electrolytic solution contains a heat stable salt and an additive that inhibits decomposition of the lithium salt, in the above, the heat stable salt has the following molecular formula:

$(M^{y+})_{x/y}R_1(SO_2N)_xSO_2R_2$, where $M^{y+}$ is one or more selected from the group consisting of $Li^+$, $Na^+$, $K^+$, $Rb^+$, $Cs^+$, $Mg^{2+}$, $Ca^{2+}$, $Ba^{2+}$, $Al^{3+}$, $Fe^{2+}$, $Fe^{3+}$, $Ni^{2+}$, and $Ni^{3+}$, optionally, $M^{y+}$ is one or more selected from the group consisting of $Li^+$, $K^+$, Cs+, and $Ba^{2+}$, and y is valence of the M;

the $R_1$ and $R_2$ are each independently selected from the group consisting of fluorine atom, fluoroalkyl having 1~20 carbon atoms, fluoroalkoxy having 1~20 carbon atoms, and alkyl having 1~20 carbon atoms, x is an integer selected from the group consisting of 1, 2, and 3, by mass percentage, a content of the heat stable salt in the electrolytic solution is w %;

the additive that inhibits decomposition of lithium salt is one or more of $RSO_3F$, where R is one or more selected from the group consisting of $Li^+$, $Na^+$, $K^+$, $Rb^+$, and $Cs^+$, by mass percentage, a content of the additive that inhibits the decomposition of lithium salt in the electrolytic solution is $m_1$%, and the w, $m_1$, and α satisfy 0.5<$m_1$w/α<20, and optionally satisfy 1<$m_1$w/α<14.

In some embodiments, α may be 2~9.5. With the α being within the above numerical ranges, the following cases can be avoided: if α is too high, the positive electrode tab possibly can hardly bear a current value under high magnification, and the tab is easy to fuse; and if α is too low, the tab may occupy a large volume of the battery core, and the volume energy density of the battery core is too low.

In some embodiments, the mass fraction $m_1$% of the additive $RSO_3F$ that inhibits the decomposition of lithium salt may be 0.1%~10%, optionally 0.2%~5%. With the $m_1$ being within the above ranges, the following cases can be avoided: if $m_1$ is too low, it may be insufficient to inhibit the decomposition of lithium salt, resulting in poor heat stability of the electrolytic solution, and if $m_1$ is too high, the conductivity of the electrolytic solution may be significantly deteriorated, the dynamics of the electrolytic solution is insufficient, the polarization during high-rate charge and discharge is large, the discharge power is deteriorated, lithium precipitation of the battery core is further caused in severe cases, and the cycle performances are deteriorated.

In some embodiments, the concentration w % of the stable lithium salt may be 8%~30%, optionally 10%~23%. With the w % being within the above ranges, the following cases can be avoided: if the concentration of the stable lithium salt is too low, it may not be sufficient to improve the heat stability of the electrolytic solution, and if the concentration is too high, the concentration of the electrolytic solution may be too high, further the dynamics of the electrolytic solution is deteriorated, and the charge and discharge power of the battery core is deteriorated.

In some embodiments, the heat stable salt has a temperature corresponding to 5% weight loss rate higher than 200° C.

In some embodiments, in the molecular formula of the heat stable salt, x=1 and y=1, or x=1 and y=2, or x=2 and y=1.

In some embodiments, in the molecular formula of the heat stable salt, $R_1$ and $R_2$ are each independently selected from fluorine atom and trifluoromethyl; and optionally, $R_1$ and $R_2$ are both fluorine atoms or both trifluoromethyl.

In some embodiments, the heat stable salt is one or more selected from the group consisting of: lithium bisfluorosulfonyl imide, potassium bisfluorosulfonyl imide, cesium bisfluorosulfonyl imide, barium bisfluorosulfonyl imide, lithium bistrifluoromethanesulfonyl imide, $Li_2F(SO_2N)_2SO_2F$, and $LiCF_3SO_2NSO_2F$.

In some embodiments, the additive that inhibits the decomposition of lithium salt is one or more of $LiSO_3F$, $NaSO_3F$, or $KSO_3F$.

In some embodiments, the electrolytic solution further may contain a fluorinated solvent, and the fluorinated solvent is one or more selected from the group consisting of fluorinated carbonate, fluorobenzene, and fluoroether. The fluorinated solvent can be used for reducing the electron cloud density of the stable lithium salt, improving the electrochemical stability of the stable lithium salt after solvation, and further reducing the decomposition and consumption of the electrolytic solution. The content of the fluorinated solvent in the electrolytic solution is $m_2$%, and optionally, a ratio $m_2/\alpha$ of $m_2$ to $\alpha$ is 1~8.

In some embodiments, the fluorinated carbonate is

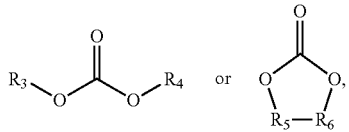

and/or, the fluorobenzene is

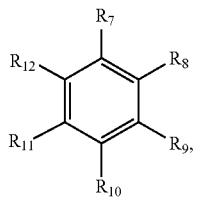

and/or, the fluoroether is $R_{1'}$—O—$R_{2'}$, where $R_3$, $R_4$, $R_5$, $R_6$, $R_{1'}$, and $R_{2'}$ are each independently —$C_xF_yH_z$, $1≤x'≤6$, y'>0, z'>0, and 0≤y'≤2x', 0≤z'≤2x', and $R_7$, $R_8$, $R_9$, $R_{10}$, $R_{11}$, and $R_{12}$ are each independently one of F or H.

In some embodiments, $R_{1'}$ and $R_{2'}$ are each independently selected from the group consisting of —$C_2F_4H$, —$CF_3$, —$C_3F_6H$, —$C_2F_3H_2$, and —$C_3F_4H_3$; optionally, $R_{1'}$ and $R_{2'}$ are each independently selected from the group consisting of —$CF_2$—$CF_2H$, —$CF_3$, —$CF_2$—$CFH$—$CF_3$, —$CH_2$—$CF_3$, and —$CH_2$—$CF_2$—$CHF_2$; and optionally, the fluoroether is selected from the following structures:

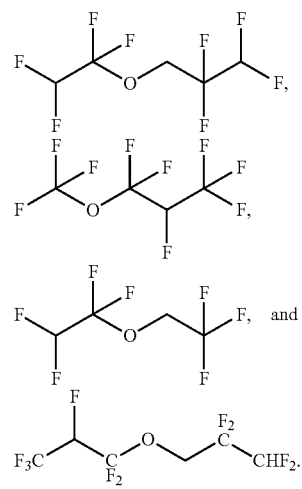

In some embodiments, $R_5$ and $R_6$ are each independently selected from the group consisting of —$C_2F_3H$, —$CFH$, and —$CH_2$; optionally, $R_5$ and $R_6$ are each independently selected from the group consisting of —$CH$—$CF_3$, —$CHF$, and —$CH_2$; and optionally, the fluorinated carbonate is selected from the group consisting of:

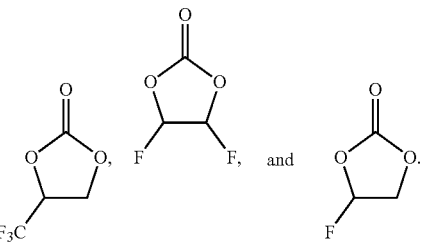

In some embodiments, $R_5$ and $R_6$ are each independently selected from the group consisting of —$CH_3$, —$C_2F_3H_2$, —$CFH_2$, and —$C_2FH_4$; optionally, $R_5$ and $R_6$ are each independently selected from the group consisting of —$CH_3$, —$CH_2$—$CF_3$, —$CH_2$—F, and —$CH_2$—$CH_2$—F; and optionally, the fluorinated carbonate is selected from the group consisting of:

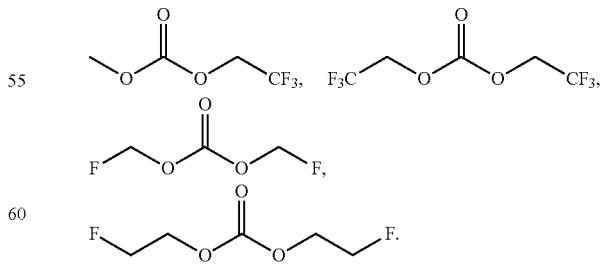

In some embodiments, the electrolytic solution further may contain an additive prone to lose electrons to be oxidized, and the additive prone to lose electrons is one or more selected from the group consisting of phosphite, borate, and phosphate. The additive prone to lose electrons to be oxidized can be oxidized into a film earlier than the stable lithium salt, and further the decomposition of stable lithium salt is reduced. A content of the additive prone to lose electrons in the electrolytic solution is $m_3\%$, and optionally, a ratio $m_3/\alpha$ of $m_3$ to $\alpha$ is 0.1~0.9.

In some embodiments, the phosphite is

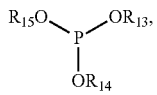

and/or, the phosphate is

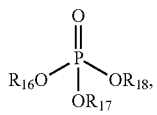

and/or, the borate is

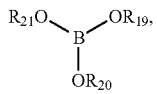

where $R_{13}$, $R_{14}$, $R_{15}$, $R_{16}$, $R_{17}$, $R_{18}$, $R_{19}$, $R_{20}$, and $R_{21}$ are each independently selected from the group consisting of: alkyl, fluoroalkyl, silyl, alkenyl, and phenyl.

In some embodiments, $R_{13}$, $R_{14}$, and $R_{15}$ are each independently selected from the group consisting of $C_{1-6}$ alkyl (e.g., methyl, ethyl) and $C_{1-6}$ fluoroalkyl (e.g., fluoromethyl, fluoroethyl, e.g., $-CH_2-CF_3$); and optionally, the phosphite is selected from

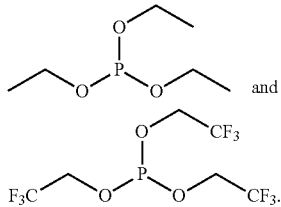

In some embodiments, $R_{16}$, $R_{17}$, and $R_{18}$ are each independently selected from $C_{1-6}$ fluoroalkyl (e.g., fluoromethyl, fluoroethyl, e.g., $-CH_2-CF_3$) and $C_{1-6}$ alkenyl (e.g., allyl); and optionally, the phosphate is selected from:

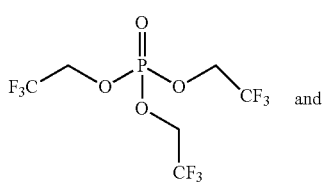

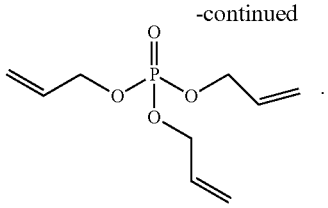

In some embodiments, $R_{19}$, $R_{20}$, and $R_{21}$ are each independently selected from the group consisting of $C_{1-6}$ alkyl (e.g., methyl, ethyl) and $C_{1-6}$ fluoroalkyl (e.g., fluoromethyl, fluoroethyl, e.g., $-CH_2-CF_3$); and optionally, the borate is selected from

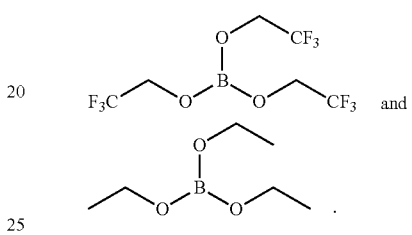

In a second aspect, the present disclosure provides a battery module, including the secondary battery in the first aspect of the present disclosure.

In a third aspect, the present disclosure provides a battery pack, including the battery module in the second aspect of the present disclosure.

In a fourth aspect, the present disclosure provides a power consumption device, including the secondary battery in the first aspect of the present disclosure, the battery module in the second aspect of the present disclosure, or the battery pack in the third aspect of the present disclosure.

The secondary battery provided in the present disclosure can inhibit the decomposition of the electrolytic solution at the tab, significantly improve the heat stability of the electrolytic solution, reduce the decomposition of the electrolytic solution at high temperatures, prolong the lifetime of the battery core, and solve the problem that the lifetime of the battery core is shortened caused by heat release of the tab during fast charge of the battery core.

REFERENCE SIGNS

Figure 1:
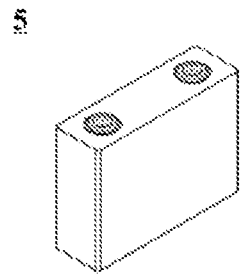
FIG. 1 is a schematic view of a secondary battery in an embodiment of the present disclosure.
Figure 2:
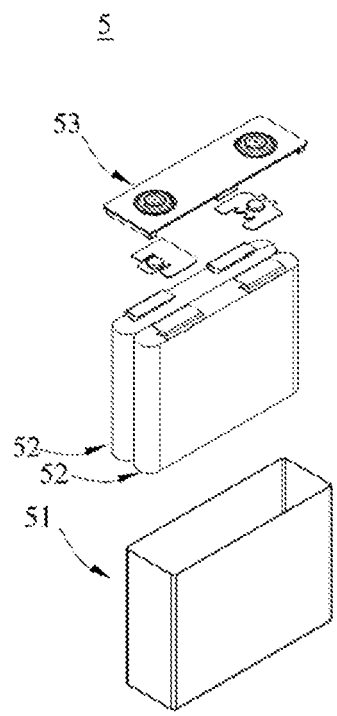
FIG. 2 is an exploded view of the secondary battery in an embodiment of the present disclosure shown in FIG. 1.

1 battery pack; 2 upper box body; 3 lower box body; 4 battery module; 5 secondary battery; 51 housing; 52 electrode assembly; 53 cover plate

DETAILED DESCRIPTION OF EMBODIMENTS

Embodiments of the present disclosure are further described in detail below in combination with examples. The following detailed description of the examples are used to exemplarily illustrate the principle of the present disclosure, but cannot be used to limit the scope of the present disclosure, that is, the present disclosure is not limited to the examples described.

Hereinafter, the embodiments disclosing a secondary battery and a manufacturing method thereof, a battery module, a battery pack, and a power consumption device in the present disclosure are described in detail. However, unnecessary detailed descriptions may be omitted in some cases. For example, there are cases where detailed descriptions of well-known items and repeated descriptions of actually identical structures are omitted. This is for the purpose of avoiding the following descriptions becoming unnecessarily lengthy and facilitating the understanding of those skilled in the art.

The "range" disclosed in the present disclosure is defined in the form of a lower limit and an upper limit, a given range is defined by selecting a lower limit and an upper limit, and the selected lower limit and upper limit define boundaries of a particular range. A range defined in this manner may include end values or not, and may be arbitrarily combined, i.e., any lower limit may be combined with any upper limit to form a range. For example, if the ranges of 60~120 and 80~110 are listed for a particular parameter, it is contemplated that the ranges of 60~110 and 80~120 are also expected. Besides, if the minimum range values listed are 1 and 2, and the maximum range values listed are 3, 4, and 5, the following ranges can be all expected: 1~3, 1~4, 1~5, 2~3, 2~4, and 2~5. In the present disclosure, unless otherwise stated, the numerical range "a~b" represents an abbreviation of combinations of any real numbers between a and b, where a and b are both real numbers. For example, the numerical range "0~5" indicates that all real numbers in "0~5" have been all listed herein, and "0~5" is just an abbreviation of combination of these numerical values. In addition, when a certain parameter is expressed as an integer greater than or equal to 2 (≥2), it is equivalent to disclosing that this parameter is, for example, an integer such as 2, 3, 4, 5, 6, 7, 8, 9, 10, 11, 12, etc.

If without special illustration, all the embodiments and optional embodiments of the present disclosure can be combined with each other to form a new technical solution.

If without special illustration, all the technical features and optional technical features of the present disclosure can be combined with each other to form a new technical solution.

If without special illustration, all steps of the present disclosure can be carried out in sequence, and also can be carried out randomly, preferably in sequence. For example, if the method includes steps (a) and (b), it means that the method may include steps (a) and (b) performed in sequence, and also may include steps (b) and (a) performed in sequence. For example, the method referred to further may include step (c), meaning that step (c) may be added to the method in any order, for example, the method may include steps (a), (b), and (c), also may include steps (a), (c), and (b), and also may include steps (c), (a), and (b), etc.

If without special illustration, the terms "include (comprise)" and "contain" mentioned in the present disclosure is open-ended, and also may be close-ended. For example, the terms "include (comprise)" and "contain" may mean that other components that are not listed also may be included or contained, or only the listed components may be included or contained.

If without special illustration, in the present disclosure, the term "or" is inclusive. For example, the phrase "A or B" means "A, B, or both A and B". More specifically, any of the following conditions satisfies the condition "A or B": A is true (or present) and B is false (or absent); A is false (or absent) and B is true (or present); or both A and B are true (or present).

Second Battery

As introduced in the background, the secondary battery may be, for example, a lithium-ion battery. In the fast charging process of the conventional lithium-ion battery, the tab releases heat seriously, the electrolytic solution near the tab will be decomposed to generate acidic high-activity substances such as HF and $PF_5$, and further the cycle service lifetime of the battery core is obviously shortened. Besides, with the increase of volume energy density of the battery core, the temperature rise coefficient of the tab of the battery is bigger, the decomposition of the electrolytic solution at the tab is further accelerated, and the lifetime of the battery core is shortened.

Generally, in the charging and discharging process, the decomposition of the electrolytic solution is directly proportional to the temperature rise at the tab, and the greater the temperature rise at the tab is, the more serious the decomposition of the electrolytic solution is. Under certain C-rate, the temperature rise at the tab of the battery core is mainly directly proportional to the resistivity and the battery core capacity of the tab, and as a positive electrode tab is usually of an aluminum-based material, and it has the resistivity far greater than negative electrode tab (usually of a copper-based material), in the charging and discharging process, the temperature rise of the positive electrode tab is usually relatively high.

In an embodiment of the present disclosure, a secondary battery is provided, including an electrode assembly and an electrolytic solution, wherein the electrode assembly includes a positive electrode plate, a negative electrode plate, and a separator, the positive electrode plate includes a positive electrode tab, and the negative electrode plate includes a negative electrode tab; and in the above, the positive electrode tab has the following temperature rise coefficient α A·h/mm:

$$\alpha = \frac{C}{10\sqrt{S1}}$$

where S1 is a total cross-sectional area of the positive electrode tab, in unit of $mm^2$; C is capacity of the electrode assembly, in unit of A·h. S1 and C can be measured or tested by conventional methods in the art.

In some embodiments, α is 2~9.5 (e.g. 2~2.5, 2.5~3, 3~3.5, 3.5~4, 4~4.5, 4.5~5, 5~5.5, 5.5~6, 6~6.5, 6.5~7, 7~7.5, 7.5~8, 8~8.5, 8.5~9 or 9~9.5). With the α being within the above numerical ranges, the following cases can be avoided: if α is too high, the positive electrode tab possibly can hardly bear a current value under high magnification, and the tab is easy to fuse; and if α is too low, the tab may occupy a large volume of the battery core, and the volume energy density of the battery core is too low.

In the secondary battery in the present disclosure, the electrolytic solution contains a heat stable salt and an additive that inhibits decomposition of the lithium salt. The heat stable salt can significantly improve the heat stability of the electrolytic solution, and reduce the decomposition of the electrolytic solution at high temperatures. However, the heat stable salt is not resistant to oxidation, and is easily decomposed and consumed, resulting in continuous decrease in the concentration of lithium salt in the electrolytic solution and the total amount of the electrolytic solution. The inventors selected $RSO_3F$ as an additive that inhibits the decomposition of lithium salt, and could significantly inhibit the decomposition of lithium salt with high heat stability.

In various embodiments, the heat stable salt in the present disclosure has the following molecular formula:

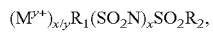

$(M^{y+})_{x/y}R_1(SO_2N)_xSO_2R_2$, where $M^{y+}$ is one or more selected from the group consisting of $Li^+$, $Na^+$, $K^+$, $Rb^+$, $Cs^+$, $Mg^{2+}$, $Ca^{2+}$, $Ba^{2+}$, $Al^{3+}$, $Fe^{2+}$, $Fe^{3+}$, $Ni^{2+}$, and $Ni^{3+}$, optionally, $M^{y+}$ is one or more selected from the group consisting of $Li^+$, $K^+$, $Cs^+$, and $Ba^{2+}$, and y is valence of the M;

the $R_1$ and $R_2$ are each independently selected from the group consisting of fluorine atoms, fluoroalkyl having 1~20 (e.g., 1~6) carbon atoms, fluoroalkoxy having 1~20 (e.g., 1~6) carbon atoms, and alkyl having 1~20 (e.g., 1~6) carbon atoms, and x is an integer selected from the group consisting of 1, 2, and 3.

By mass percentage, the content of the heat stable salt in the electrolytic solution is w %. In some embodiments, w % may be 8%~30%, optionally 10%~23% (for example, 8%~9%, 9%~10%, 10%~11%, 11%~12%, 12%~13%, 13%~14%, 14%~15%, 15%~16%, 16%~17%, 17%~18%, 18%~19%, 19%~20%, 20%~21%, 21%~22%, 22%~23%, 23%~24%, 24%~25%, 25%~26%, 26%~27%, 27%~28%, 28%~29% or 29%~30%). With the w % being within the above ranges, the following cases can be avoided: if the concentration of the heat stable lithium salt is too low, it may not be sufficient to improve the heat stability of the electrolytic solution, and if the concentration of the heat stable lithium salt is too high, the concentration of the electrolytic solution may be too high, further the dynamics of the electrolytic solution is deteriorated, and the charge and discharge power of the battery core is deteriorated.

The additive that inhibits the decomposition of lithium salt used in the present disclosure is one or more of $RSO_3F$, where R is one or more selected from the group consisting of $Li^+$, $Na^+$, $K^+$, $Rb^+$, and $Cs+$.

By mass percentage, the content of the additive that inhibits the decomposition of lithium salt in the electrolytic solution is $m_1$%. In some embodiments, the mass fraction $m_1$% of the additive $RSO_3F$ that inhibits the decomposition of lithium salt may be 0.1%~10%, optionally 0.2%~5% (for example, 0.1%~0.2%, 0.2%~0.4%, 0.4%~0.6%, 0.6%~0.8%, 0.8%~1%, 1%~1.5%, 1.5%~2%, 2%~2.5%, 2.5%~3%, 3%~3.5%, 3.5%~4%, 4%~4.5%, 4.5%~5%, 5%~6%, 6%~7%, 7%~8%, 8%~9% or 9%~10%). With the $m_1$ being within the above ranges, the following cases can be avoided: if $m_1$ is too low, it may be insufficient to inhibit the decomposition of lithium salt, resulting in poor heat stability of the electrolytic solution, and if $m_1$ is too high, the conductivity of the electrolytic solution may be significantly deteriorated, the dynamics of the electrolytic solution is insufficient, the polarization during high-rate charge and discharge is large, the discharge power is deteriorated, lithium precipitation of the battery core is further caused in severe cases, and the cycle performances are deteriorated.

Further, the inventors found through a large number of experiments that w, $m_1$, and α satisfying $0.5 < m_1 w/\alpha < 20$ can better solve the problem of electrolytic solution decomposition caused by heat release from the tab in the high-rate charge and discharge process of the battery core, reduce the total consumption of the electrolytic solution, and further promote the power and performances of the battery core in the middle stage of cycle. In some embodiments, w, $m_1$, and α satisfy: $1 < m_1 w/\alpha < 14$. In some embodiments, $m_1 w/\alpha$ is 0.5~0.6, 0.6~0.7, 0.7~0.8, 0.8~0.9, 0.9~1, 1~2, 2~3, 3~4, 4~5, 5~6, 6~7, 7~8, 8~9, 9~10, 10~11, 11~12, 12~13, 13~14, 14~15, 15~16, 16~17, 17~18, 18~19 or 19~20.

In some embodiments, the heat stable salt has a temperature higher than 200° C. corresponding to 5% weight loss rate. The relationship between the weight and the temperature of the heat stable salt can be measured by thermogravimetric analysis, to obtain the temperature corresponding to 5% weight loss.

In some embodiments, in the molecular formula of the heat stable salt, x=1 and y=1, or x=1 and y=2, or x=2 and y=1.

In some embodiments, in the molecular formula of the heat stable salt, $R_1$ and $R_2$ are each independently selected from fluorine atom and trifluoromethyl. In some embodiments, $R_1$ and $R_2$ are both fluorine atoms or both trifluoromethyl.

In some embodiments, the heat stable salt is one or more selected from the group consisting of: lithium bisfluorosulfonyl imide (LiFSI), potassium bisfluorosulfonyl imide (KFSI), cesium bisfluorosulfonyl imide (CsFSI), barium bisfluorosulfonyl imide $(Ba(FSI)_2)$, lithium bistrifluoromethanesulfonyl imide (LiTFSI), $Li_2F(SO_2N)_2SO_2F$, and $LiCF_3SO_2NSO_2F$.

In some embodiments, the additive that inhibits the decomposition of lithium salt is one or more of $LiSO_3F$, $NaSO_3F$, or $KSO_3F$.

In the secondary battery of the present disclosure, the electrolytic solution further may contain a fluorinated solvent for reducing the electron cloud density of the stable lithium salt, further improving the electrochemical stability of the stable lithium salt after solvation, and further reducing the decomposition and consumption of the electrolytic solution. The fluorinated solvent can be one or more selected from the group consisting of fluorinated carbonate, fluorobenzene, and fluoroether. The content of the fluorinated solvent is $m_2$%, and a ratio $m_2/\alpha$ of $m_2$ to α is optionally 1~8, for example, 1~1.5, 1.5~2, 2~2.5, 2.5~3, 3~3.5, 3.5~4, 4~4.5, 4.5~5, 5~6, 6~7 or 7~8.

In some embodiments, the fluorinated carbonate is

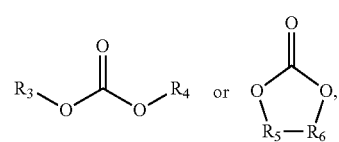

in some embodiments, the fluorobenzene is

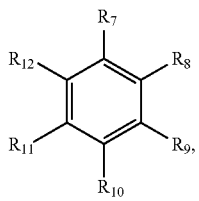

and in some embodiments, the fluoroether is $R_{1'}$—O—$R_{2'}$, where $R_3$, $R_4$, $R_5$, $R_6$, $R_{1'}$, and $R_{2'}$ are each independently —$C_xF_yH_z$, $1 \le x' \le 6$, $y' > 0$, $z' > 0$, and $0 \le y' \le 2x'$, $0 \le z' \le 2x'$, and $R_7$, $R_8$, $R_9$, $R_{10}$, $R_{11}$, and $R_{12}$ are each independently one of F or H.

In some embodiments, $R_{1'}$ and $R_{2'}$ are each independently selected from the group consisting of —$C_2F_4H$, —$CF_3$, —$C_3F_6H$, —$C_2F_3H_2$, and —$C_3F_4H_3$.

In some embodiments, $R_{1'}$ and $R_{2'}$ are each independently selected from the group consisting of —$CF_2$—$CF_2H$, —$CF_3$, —$CF_2$—$CFH$—$CF_3$, —$CH_2$—$CF_3$, and —$CH_2$—$CF_2$—$CHF_2$.

In some embodiments, the fluoroether is selected from the following structures:

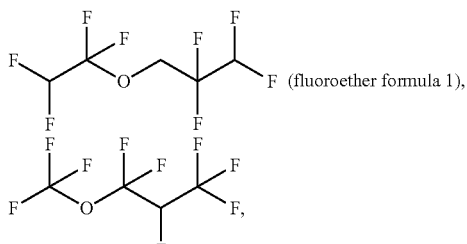 (fluoroether formula 1),

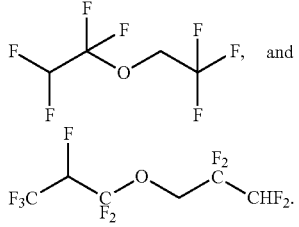 and

In some embodiments, $R_5$ and $R_6$ are each independently selected from the group consisting of —$C_2F_3H$, —$CFH$, and —$CH_2$.

In some embodiments, $R_5$ and $R_6$ are each independently selected from the group consisting of —CH—$CF_3$, —CHF, and —$CH_2$.

In some embodiments, the fluorinated carbonate is selected from the group consisting of:

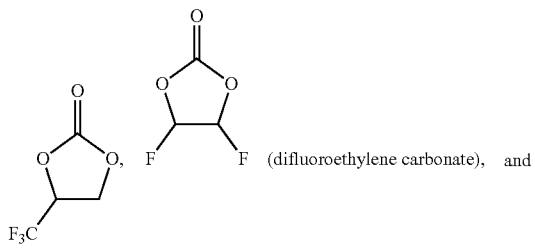 (difluoroethylene carbonate), and

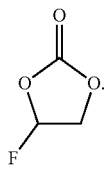

In some embodiments, $R_5$ and $R_6$ are each independently selected from the group consisting of —$CH_3$, —$C_2F_3H_2$, —$CFH_2$, and —$C_2FH_4$.

In some embodiments, $R_5$ and $R_6$ are each independently selected from the group consisting of —$CH_3$, —$CH_2$—$CF_3$, —$CH_2$—F, and —$CH_2$—$CH_2$—F.

In some embodiments, the fluorinated carbonate is selected from the group consisting of:

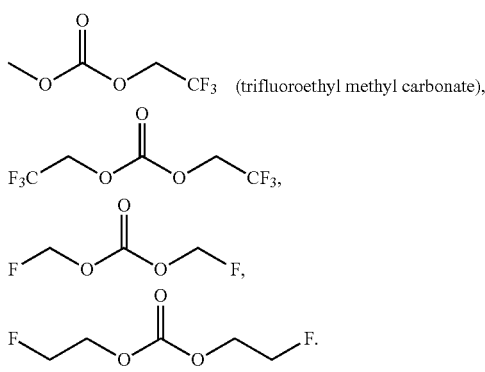

In some embodiments, the fluorinated solvent is fluorobenzene (i.e., monofluorobenzene).

In the secondary battery of the present disclosure, the electrolytic solution further may contain an additive prone to lose electrons. The additive prone to lose electrons can be oxidized into a film in advance, the decomposition of stable lithium salt is further reduced, and the total consumption of the electrolytic solution is further reduced, so that the electrolytic solution in the battery core is sufficient in the middle stage of cycle, the transmission dynamics of the lithium ion is relatively good, the interface impedance is relatively low, and finally the power and performances of the battery core are relatively good in the middle stage of cycle.

In some embodiments, the additive prone to lose electrons is one or more selected from the group consisting of phosphite, borate, and phosphate.

In some embodiments, a content of the additive prone to lose electrons in the electrolytic solution is $m_3$%, and a ratio $m_3/\alpha$ of $m_3$ to $\alpha$ is optionally 0.1~0.9, for example, 0.1~0.2, 0.2~0.3, 0.3~0.4, 0.4~0.5, 0.5~0.6, 0.6~0.7, 0.7~0.8 or 0.8~0.9.

In some embodiments, the phosphite is

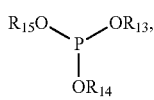

in some embodiments, the phosphate is

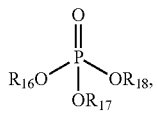

and in some embodiments, the borate is

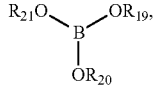

where $R_{13}$, $R_{14}$, $R_{15}$, $R_{16}$, $R_{17}$, $R_{18}$, $R_{19}$, $R_{20}$, and $R_{21}$ are each independently selected from the group consisting of: alkyl, fluoroalkyl, silyl, alkenyl, and phenyl.

In some embodiments, $R_{13}$, $R_{14}$, and $R_{15}$ are each independently selected from the group consisting of $C_{1-6}$ alkyl (e.g., methyl, ethyl) and $C_{1-6}$ fluoroalkyl (e.g., fluoromethyl, fluoroethyl, e.g., —$CH_2$—$CF_3$).

In some embodiments, the phosphite is selected from

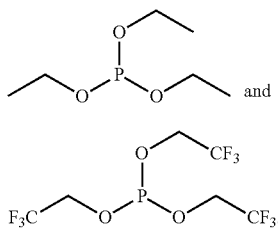

(additive 1)

(additive 2)

In some embodiments, $R_{16}$, $R_{17}$, and $R_{18}$ are each independently selected from $C_{1-6}$ fluoroalkyl (e.g., fluoromethyl, fluoroethyl, e.g., —$CH_2$—$CF_3$) and $C_{1-6}$ alkenyl (e.g., allyl).

In some embodiments, the phosphate is selected from:

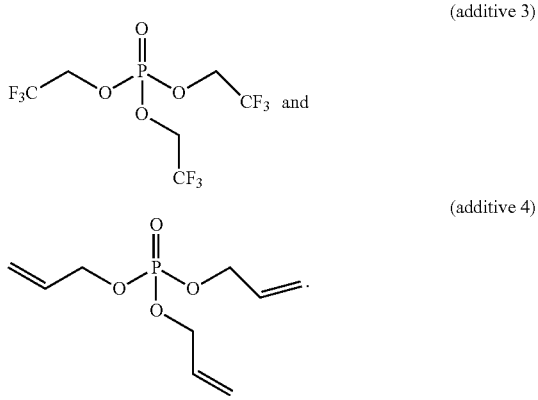

(additive 3)

(additive 4)

In some embodiments, $R_{19}$, $R_{20}$, and $R_{21}$ are each independently selected from the group consisting of $C_{1-6}$ alkyl (e.g., methyl, ethyl) and $C_{1-6}$ fluoroalkyl (e.g., fluoromethyl, fluoroethyl, e.g., —$CH_2$—$CF_3$).

In some embodiments, the borate is selected from

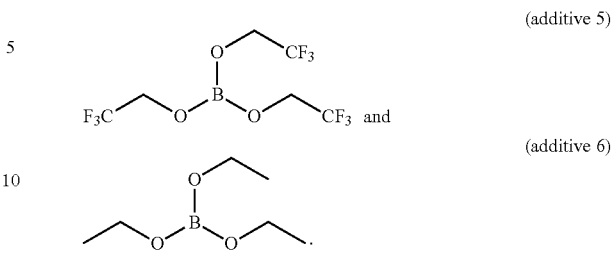

(additive 5)

(additive 6)

In some embodiments, in the electrolytic solution of the secondary battery of the present disclosure, the heat stable salt and the additive that inhibits decomposition of lithium salt are LiFSI and LiSO₃F, respectively. In some preferred embodiments, w, $m_1$, and α satisfy: $1<m_1 w/\alpha<14$. In some more preferred embodiments, α is 2~9.5.

In some embodiments, in the secondary battery of the present disclosure, the electrolytic solution contains the heat stable salt LiFSI and the additive LiSO₃F that inhibits decomposition of lithium salt, and further contains a fluorinated solvent selected from the group consisting of: trifluoroethyl methyl carbonate, fluorobenzene, difluoroethylene carbonate, the fluoroether of formula 1 described above, and a mixed solvent of trifluoroethyl methyl carbonate/difluoroethylene carbonate/fluorobenzene (for example, a mixed solvent at a mass ratio of 3/1/1). In some preferred embodiments, the content of the fluorinated solvent is $m_2$%, and a ratio $m_2/\alpha$ of $m_2$ to α is 1~8.

In some embodiments, in the secondary battery of the present disclosure, the electrolytic solution contains the heat stable salt LiFSI and the additive LiSO₃F that inhibits decomposition of lithium salt, and further contains an additive prone to lose electrons, wherein the additive prone to lose electrons is selected from the group consisting of the additive 1, the additive 2, the additive 3, the additive 4, and the additive 5 described above. In some preferred embodiments, the content of the additive prone to lose electrons in the electrolytic solution is $m_3$%, and a ratio $m_3/\alpha$ of $m_3$ to α is 0.1~0.9.

In the secondary battery of the present disclosure, the electrolytic solution further may contain an organic solvent. The type of the organic solvent is not particularly limited, and may be selected according to actual requirements. In some embodiments, the organic solvent may include one or more selected from the group consisting of chain carbonate, cyclic carbonate, and carboxylic ester. In the above, the types of the chain carbonate, the cyclic carbonate, and the carboxylic ester are not specifically limited, and may be selected according to actual requirements. Optionally, the organic solvent further may include one or more selected from the group consisting of diethyl carbonate, dipropyl carbonate, ethyl methyl carbonate (EMC), methyl propyl carbonate, ethyl propyl carbonate, ethylene carbonate (EC), propylene carbonate, butylene carbonate, γ-butyrolactone, methyl formate, ethyl acetate, propyl acetate, methyl propionate, ethyl propionate, methyl propionate, and tetrahydrofuran.

In the secondary battery in accordance with the present disclosure, the electrolytic solution further may contain an additive for improving gas generation, storage or power performances of the battery. In some embodiments, the additive may be one or more selected from the group consisting of: a cyclic carbonate compound containing an unsaturated bond, a halogen-substituted cyclic carbonate compound, a sulfate ester compound, a sulfite compound, a sultone compound, a disulfonic acid compound, a nitrile compound, an aromatic compound, an isocyanate compound, a phosphazene compound, a cyclic anhydride compound, a phosphite compound, and a carboxylate compound; in the above, the cyclic carbonate compound containing an unsaturated bond and the halogen-substituted cyclic carbonate compound are different from the cyclic carbonate described in the preceding.

Besides, the secondary battery, the battery module, the battery pack, and the power consumption device of the present disclosure are described below with appropriate reference to the accompanying drawings.

In an embodiment of the present disclosure, a secondary battery is provided.

Generally, the secondary battery includes a positive electrode plate, a negative electrode plate, an electrolyte, and a separator. In a charging and discharging process of the battery, active ions are embedded and separated back and forth between the positive electrode plate and the negative electrode plate. The electrolyte plays a role of conducting ions between the positive electrode plate and the negative electrode plate. The separator is provided between the positive electrode plate and the negative electrode plate, and mainly plays a role of preventing short circuit of positive and negative electrodes, and meanwhile can make the ions pass through.

[Positive Electrode Plate]

In the secondary battery of the present disclosure, the positive electrode plate may include a positive electrode current collector and a positive electrode material layer provided on the positive electrode current collector and including a positive electrode active material, and the positive electrode material layer may be provided on a surface of the positive electrode current collector, and also may be provided on two surfaces of the positive electrode current collector.

In some embodiments, the positive electrode current collector may be a metallic foil or a composite current collector. For example, an aluminum foil can be used as the metallic foil. The composite current collector may include a polymer material substrate layer and a metal layer formed on at least one surface of the polymer material substrate layer. The composite current collector can be formed by forming a metal material (aluminum, aluminum alloy, nickel, nickel alloy, titanium, titanium alloy, silver, and silver alloy, etc.) on a polymer material substrate (e.g., a substrate of polypropylene (PP), polyethylene terephthalate (PET), polybutylene terephthalate (PBT), polystyrene (PS), polyethylene (PE), etc.).

In some embodiments, the positive active material may use a positive active material for the battery well known in the art. As an example, the positive electrode active material may include at least one of the following materials: olivine-structured lithium-containing phosphates, lithium transition metal oxides and their respective modified compounds. However, the present disclosure is not limited to these materials, and other conventional materials that can be used as a positive electrode active material of a battery also may be used. These positive electrode active materials may be used alone or a combination of two or more may be used. In the above, examples of the lithium transition metal oxide may include, but are not limited to, at least one of lithium cobalt oxide (e.g., $LiCoO_2$), lithium nickel oxide (e.g., $LiNiO_2$), lithium manganese oxide (e.g., $LiMnO_2$, $LiMn_2O_4$), lithium nickel cobalt oxide, lithium manganese cobalt oxide, lithium nickel manganese oxide, lithium nickel cobalt manganese oxide (e.g., $LiNi_{1/3}Co_{1/3}Mn_{1/3}O_2$ (also referred to as $NCM_{333}$ for short), $LiNi_{0.5}Co_{0.2}Mn_{0.3}O_2$ (also referred to as $NCM_{523}$ for short), $LiNi_{0.5}Co_{0.25}Mn_{0.25}O_2$ (also referred to as $NCM_{211}$ for short), $LiNi_{0.6}Co_{0.2}Mn_{0.2}C_2$ (also referred to as $NCM_{622}$ for short), $LiNi_{0.8}Co_{0.1}Mn_{0.1}O_2$ (also referred to as $NCM_{811}$ for short)), lithium nickel cobalt aluminum oxide (e.g., $liNi_{0.85}Co_{0.15}Al_{0.05}O_2$), and modified compounds thereof. Examples of the olivine-structured lithium-containing phosphate may include, but are not limited to, at least one of lithium iron phosphate (e.g., $LiFePO_4$ (also referred to as LFP for short)), a composite material of lithium iron phosphate and carbon, lithium manganese phosphate (e.g., $LiMnPO_4$), a composite material of lithium manganese phosphate and carbon, lithium manganese iron phosphate, and a composite material of lithium manganese iron phosphate and carbon.

In some embodiments, the positive electrode material layer further optionally includes a binder. The types and contents of the conductive agent and the binder are not specifically limited, and may be selected according to actual requirements. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode material layer further optionally includes a conductive agent. As an example, the conductive agent may include at least one of superconducting carbon, acetylene black, carbon black, ketjen black, carbon dots, carbon nanotubes, graphene, and carbon nanofibers.

In some embodiments, the positive electrode plate may be prepared in a following manner: dispersing the foregoing components for preparing the positive electrode plate, for example, the positive electrode active material, the conductive agent, the binder, and any other components in a solvent (for example, N-methylpyrrolidone), to form a positive electrode slurry; and coating the positive electrode slurry on the positive electrode current collector, followed by procedures such as drying and cold pressing, to obtain the positive electrode plate.

In some embodiments, the positive electrode material layer contains the positive electrode active material, large single crystal nickel cobalt lithium manganate ($NCM_{523}$), the conductive agent acetylene black, and the binder polyvinylidene fluoride (PVDF).

[Negative Electrode Plate]

In the secondary battery of the present disclosure, the negative electrode plate may include a negative electrode current collector and a negative electrode material layer provided on the negative electrode current collector and including a negative electrode active material, and the negative electrode material layer may be provided on a surface of the negative electrode current collector, and also may be provided on two surfaces of the negative electrode current collector.

In some embodiments, the negative electrode current collector can be a metallic foil or a composite current collector. For example, a copper foil can be used as the metallic foil. The composite current collector may include a polymer material substrate layer and a metal layer formed on at least one surface of the polymer material substrate. The composite current collector can be formed by forming a metal material (copper, copper alloy, nickel, nickel alloy, titanium, titanium alloy, silver, and silver alloy, etc.) on a polymer material substrate (e.g., a substrate of polypropylene (PP), polyethylene terephthalate (PET), polybutylene terephthalate (PBT), polystyrene (PS), polyethylene (PE), etc.).

In some embodiments, the negative active material may use a negative active material for the battery well known in the art. As an example, the negative electrode active material may include at least one of the following materials: graphite (for example, artificial graphite and natural graphite), soft carbon, hard carbon, mesocarbon microbead, carbon fiber, carbon nanotube, silicon-based material, tin-based material, and lithium titanate, etc. The silicon-based material may be at least one selected from the group consisting of elemental silicon, a silicon-oxygen compound, a silicon-carbon composite, a silicon-nitrogen composite, and a silicon alloy. The tin-based material may be at least one selected from the group consisting of elemental tin, a tin oxide compound, and a tin alloy. However, the present disclosure is not limited to these materials, and other conventional materials that can be used as a negative electrode active material of a battery also may be used. These negative electrode active materials may be used alone or a combination of two or more may be used.

In some embodiments, a negative electrode material layer further includes a binder. The binder may be at least one selected from the group consisting of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode material layer further optionally includes a conductive agent. The conductive agent may be at least one selected from the group consisting of superconducting carbon, acetylene black, carbon black, ketjen black, carbon dots, carbon nanotubes, graphene, and carbon nanofibers.

In some embodiments, the negative electrode material layer contains the negative active material artificial graphite, the conductive agent acetylene black, and the binder styrene-butadiene rubber (SBR).

In some embodiments, the negative electrode material layer further optionally includes other auxiliary agents, for example, a thickening agent (such as, carboxymethylcellulose sodium (CMC-Na)), etc.

In some embodiments, the negative electrode plate may be prepared in a following manner: dispersing the foregoing components for preparing the negative electrode plate, for example, the negative electrode active material, the conductive agent, the binder, and any other components in a solvent (for example, deionized water), to form a negative electrode slurry; and coating the negative electrode slurry on the negative electrode current collector, followed by procedures such as drying and cold pressing, to obtain the negative electrode plate.

[Separator]

In the secondary battery of the present disclosure, the separator is provided between the positive electrode plate and the negative electrode plate, and serves a function of separation. In the above, the type of the separator is not specifically limited, and any well-known porous-structured separator having good chemical stability and mechanical stability can be selected. In some embodiments, the material of the separator may be at least one selected from the group consisting of glass fiber, non-woven fabric, polyethylene, polypropylene, and polyvinylidene fluoride. The separator may be a single-layer thin film, and also may be a multi-layer composite thin film, which is not particularly limited.

When the separator is a multi-layer composite thin film, materials of various layers may be the same or different, and are not particularly limited.

The secondary battery of the present disclosure may be a lithium-ion battery.

The secondary battery of the present disclosure may be prepared by a conventional method. In some embodiments, the positive electrode plate, the negative electrode plate, and the separator may be fabricated into an electrode assembly through a winding process or a lamination process. An exemplary preparation method includes:

step 1: stacking the positive electrode plate, the separator, and the negative electrode plate in sequence, so that the separator is located between the positive and negative electrode plates, and then winding them to obtain an electrode assembly; and step 2: disposing the electrode assembly in a secondary battery housing, after drying, injecting an electrolytic solution, and then carrying out formation and standing processes to obtain a secondary battery.

In some embodiments, the secondary battery of the present disclosure may contain an outer package. The outer package can be used to encapsulate the above electrode assembly and electrolyte.

In some embodiments, the outer package of the secondary battery may be a hard shell, for example, a hard plastic shell, an aluminum shell, a steel shell, etc. The outer package of the secondary battery also may be a soft package, for example, a pouch type soft package. The material of the soft package may be plastic, and examples of the plastic may include polypropylene, polybutylene terephthalate, and polybutylene succinate, etc.

Figure 5:
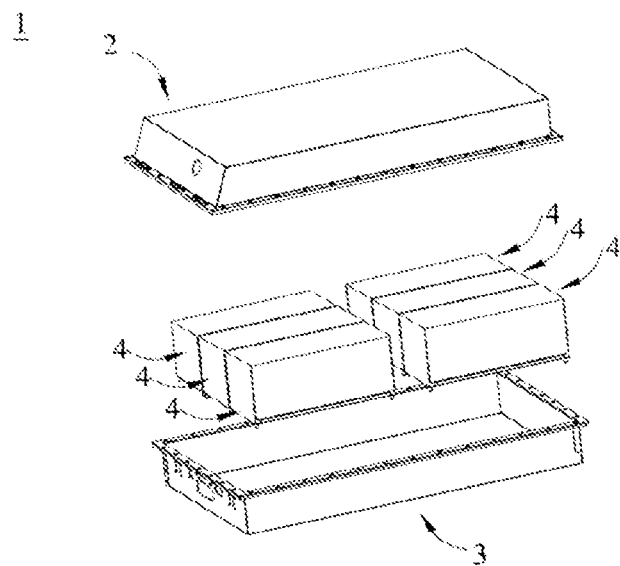
FIG. 5 is an exploded view of the battery pack in an embodiment of the present disclosure shown in FIG. 4.

There is no particular limitation on the shape of the secondary battery in the present disclosure, and it may be cylindrical, square or in any other arbitrary shapes. For example, FIG. 5 shows a secondary battery 5 in a square structure as an example.

Figure 6:
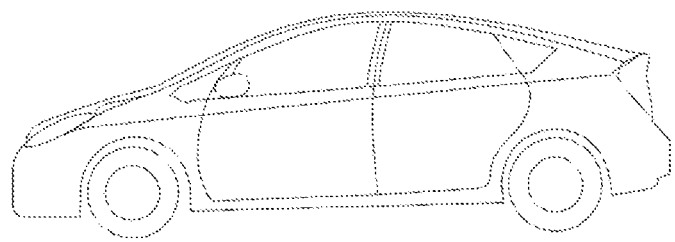
FIG. 6 is a schematic view of a power consumption device using the secondary battery in an embodiment of the present disclosure as a power supply.

In some embodiments, referring to FIG. 6, the outer package may include a housing 51 and a cover plate 53. In the above, the housing 51 may include a bottom plate and a side plate connected to the bottom plate, and the bottom plate and the side plate are enclosed to form an accommodating cavity. The housing 51 has an opening in communication with the accommodating cavity, and the cover plate 53 can be provided to cover the opening so as to close the accommodating cavity. The positive electrode plate, the negative electrode plate, and the separator can form an electrode assembly 52 through a winding process or a lamination process. The electrode assembly 52 is encapsulated in the accommodating cavity. The electrolytic solution is soaked in the electrode assembly 52. The number of electrode assemblies 52 contained in the secondary battery 5 can be one or more, and those skilled in the art could make a selection according to actual requirements.

In some embodiments, the secondary batteries can be assembled into a battery module, the number of secondary batteries contained in the battery module may be one or more, and those skilled in the art could select the specific number according to the application and capacity of the battery module.

Figure 3:
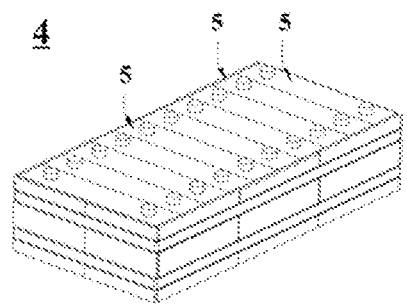
FIG. 3 is a schematic view of a battery module in an embodiment of the present disclosure.

FIG. 3 shows a battery module 4 as an example. Referring to FIG. 3, in the battery module 4, a plurality of secondary batteries 5 may be sequentially arranged in a longitudinal direction of the battery module 4. Without doubt, the secondary batteries 5 also may be arranged in any other manners. Further, the plurality of secondary batteries 5 may be fixed by fasteners.

Optionally, the battery module 4 further may include an enclosure having an accommodating space, and the plurality of secondary batteries 5 are accommodated in the accommodating space.

In some embodiments, the above battery module further may be assembled into a battery pack, the number of battery modules contained by the battery pack may be one or more, and the specific number can be selected by those skilled in the art according to the application and capacity of the battery pack.

Figure 4:
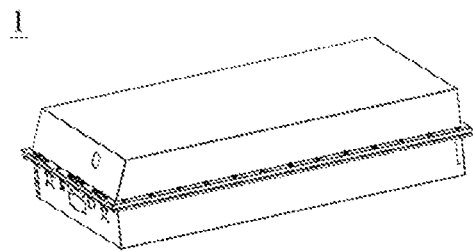
FIG. 4 is a schematic view of a battery pack in an embodiment of the present disclosure.

FIG. 4 and FIG. 5 show a battery pack 1 as an example. Referring to FIG. 4 and FIG. 5, a battery box and a plurality of battery modules 4 provided in the battery box may be included in the battery pack 1. The battery box includes an upper box body 2 and a lower box body 3, and the upper box body 2 can be provided to cover the lower box body 3, and form an enclosed space for accommodating the battery modules 4. The plurality of battery modules 4 may be arranged in the battery box in an arbitrary manner.

In addition, the present disclosure further provides a power consumption device, wherein the power consumption device includes the secondary battery, the battery module or the battery pack provided in the present disclosure. The secondary battery, the battery module, or the battery pack can be used as a power supply of the power consumption device, and also may be used as an energy storage unit of the power consumption device. The power consumption device may be selected from a mobile device (for example, a mobile phone, a notebook computer, etc.), an electric vehicle (for example, a battery electric vehicle, a hybrid electric vehicle, a plug-in hybrid electric vehicle, an electric bicycle, an electric scooter, an electric golf cart, an electric truck, etc.), an electric train, a ship and a satellite, an energy storage system, etc., but is not limited thereto. For the power consumption device, the secondary battery, the battery module or the battery pack may be selected in accordance with use requirements thereof.

FIG. 6 shows the power consumption device as an example. This power consumption device is a battery electric vehicle, a hybrid electric vehicle, a plug-in hybrid electric vehicle, etc. In order to meet the requirements of the power consumption device for high power and high energy density of the secondary battery, the battery pack or the battery module may be used.

The device as another example may be a mobile phone, a tablet computer, a notebook computer, etc. The device is generally required to be light and thin, and may use the secondary battery as a power supply.

Example

Hereinafter, examples of the present disclosure are described. The examples described below are exemplary, and merely used to explain the present disclosure, but cannot be construed as limitation to the present disclosure. Where specific techniques or conditions are not specified in the examples, they are carried out according to techniques or conditions described in documents in the art or according to product specifications. If manufacturers of reagents or apparatuses used are not specified, all of them are conventional products commercially available.

The lithium-ion batteries of the examples and comparative examples are all prepared according to the following method (1) Preparation of Positive Electrode Plate A positive electrode active material $NCM_{523}$, a conductive agent acetylene black, and a binder polyvinylidene fluoride (PVDF) were dissolved in a solvent N-methylpyrrolidone (NMP) at a weight ratio of 96.5:1.5:2, and fully stirred and well mixed to obtain a positive electrode slurry; then, the positive electrode slurry was uniformly coated on a positive electrode current collector with a coating weight of 18.18 mg/cm$^2$, followed by drying, cold pressing, and splitting, to obtain a positive electrode plate.

(2) Preparation of Negative Electrode Plate

An active substance artificial graphite, the conductive agent acetylene black, a binder styrene-butadiene rubber (SBR), and a thickening agent carboxymethylcellulose sodium (CMC-Na) were dissolved in a solvent deionized water at a weight ratio of 95:2:2:1 and well mixed with the solvent deionized water to prepare a negative electrode slurry; then, the negative electrode slurry was uniformly coated on a negative electrode current collector copper foil, with a coating weight of 10.58 mg/cm$^2$, followed by drying to obtain a negative electrode film sheet, and then the negative electrode film sheet was subjected to cold pressing and splitting to obtain a negative electrode plate.

(3) Preparation of Electrolytic Solution

In an argon-atmosphere glovebox ($H_2O$<0.1 ppm, $O_2$<0.1 ppm), organic solvents EC/EMC were well mixed at a mass ratio of 3/7, and salts and additives shown in Tables 1-4 were added and well stirred, to obtain a corresponding electrolytic solution.

(4) Preparation of Separator: A Polypropylene Film was Used as a Separator.

(5) Method of Measuring Cross-Sectional Area S of Tab

A battery core was disassembled, then a thickness h (μm) of a positive electrode tab was measured with a micrometer, an average width L (mm) of the tab was measured with a conventional ruler, and the total number of positive electrode tabs in a single battery core was n, then an average cross-sectional area S of the positive electrode tabs of the corresponding single battery core was: n×L×h/1000 (mm$^2$)

(6) Preparation of Lithium-Ion Battery

The positive electrode plate, the separator, and the negative electrode plate was stacked in sequence, so that the separator was located between the positive and negative electrode plates and served a function separation, and then they were wound to obtain an electrode assembly; the electrode assembly was placed in a battery housing, and dried, then an electrolytic solution was injected, followed by processes such as formation and standing to obtain a lithium-ion battery. The mass of the electrolytic solution was $n_4$ (g), where $n_4$=2.8 g/A·h×C, where 2.8 g/A·h denotes an injection coefficient, and C denotes capacity of the battery core (unit: A·h).

A process of testing the lithium-ion battery is as follows:
(1) Testing Capacity of Battery Core At 25° C., the lithium-ion battery was charged to 4.35 V at a constant current of 1 C, then charged to a current of less than 0.05 C at a constant voltage of 4.35 V, and then discharged again to 2.8 V at 0.33 C, to obtain a discharge capacity C (unit: A·h).

2. Testing Cycle Performance of Lithium-Ion Battery at 45° C.

At 45° C., the lithium-ion battery was charged to 4.35 V at a constant current of 1.5 C, then charged to a current of less than 0.05 C at a constant voltage of 4.35 V, and then the lithium-ion battery was discharged to 2.8 V at a constant current of 1.5 C. This is a charge and discharge process. Charge and discharge was carried out repeatedly in this way, for 500 cycles.

3. Internal Resistance of Battery Core

The amount of power of the above battery core having undergone 500 cycles was adjusted to 50% SOC, then an internal resistance of the battery was tested with an AC internal resistance tester, wherein the perturbation was 5 mv, and the frequency was 1000 Hertz.

4. Testing Electrolytic Solution

The weight of the above battery core having undergone 500 cycles was weighed on a balance and recorded as $n_1(g)$, the above battery core having undergone 500 cycles was discharged to 2.8 V at a constant current of 0.1 C, then centrifuged (5000 rpm×30 min). The electrolytic solution was subjected to ion chromatography analysis to obtain a corresponding lithium salt content $w_2$. A process of ion chromatography analysis was weighing the sample, diluting and dosing the sample with deionized water, and detecting an anion content of the treated sample with Dionex ICS-900 instrument.

The electrode plates and the separator of the battery core were soaked in DMC for 3 times to fully remove the electrolytic solution remaining in the electrode plates and the separator, then, the outer package of the battery core, the electrode plates, and the separator were all dried in vacuum at 60° C. for 24 h, then weighed, and recorded as $n_2(g)$, then the mass of the remaining electrolytic solution of the corresponding battery core was $n_3(g)=n_1-n_2$, and the mass fraction of the corresponding remaining electrolytic solution was $n_3/n_4$.

The mass of the lithium salt in the remaining electrolytic solution was $w_2 \times n_3$, and the mass of the lithium salt in the electrolytic solution initially injected into the battery core was $w_2 \times n_4$. The mass fraction of the lithium salt in the remaining electrolytic solution was: the mass of the lithium salt in the remaining electrolytic solution/the mass of the lithium salt in the electrolytic solution initially injected into the battery core×100%, i.e., $(w_2 \times n_3)/(w_2 \times n_4)$.

See Tables 1-4 for test results.

TABLE 1

| No. | tab cross-sectional area S/mm² | battery core capacity C/A·h | α | LiFSI concentration/ % w | LiSO₃F content/ % mi | $m_1 w/\alpha$ | percentage of remaining centrifuged electrolytic solution after 500 cls | remaining lithium salt content in centrifuged electrolytic solution after 500 cls | internal resistance of battery core after 500 cls mΩ |
|---|---|---|---|---|---|---|---|---|---|
| Comparative Example 1 | 24.96 | 280 | 5.60 | 0 | 0 | 0.00 | 64.1% | 69.2% | 0.823 |
| Comparative Example 2 | 24.96 | 280 | 5.60 | 18 | 0 | 0.00 | 65.8% | 72.3% | 0.765 |
| Comparative Example 3 | 24.96 | 280 | 5.60 | 0 | 2 | 0 | 65.3% | 69.8% | 0.782 |
| Comparative Example 4 | 24.96 | 280 | 5.60 | 15 | 0.15 | 0.40 | 75.1% | 81.6% | 0.653 |
| Example 1 | 24.96 | 280 | 5.60 | 10 | 0.3 | 0.54 | 84.2% | 85.2% | 0.562 |
| Example 2 | 24.96 | 280 | 5.60 | 25 | 4.4 | 19.63 | 84.5% | 85.5% | 0.533 |
| Example 3 | 24.96 | 280 | 5.60 | 22 | 3.5 | 13.7 | 86.4% | 87.2% | 0.495 |
| Example 4 | 24.96 | 280 | 5.60 | 18 | 2 | 6.4 | 86.0% | 87.9% | 0.499 |
| Comparative Example 5 | 24.96 | 280 | 5.60 | 30 | 5 | 26.8 | 75.3% | 82.3% | 0.622 |

Note: the lithium salt in Comparative Example 3 is LiFP6, accounting for 18% of the mass fraction of the electrolytic solution.

From Table 1, it can be seen that the heat stable salt LiFSI or the additive LiSO₃F that inhibits lithium salt decomposition is not added to the electrolytic solution of Comparative Example 1, LiSO₃F is not added to Comparative Example 2, LiFSI is not added to Comparative Example 3, after 500 cycles, more electrolytic solutions are decomposed, the content of remaining lithium salt in the electrolytic solution is lower, and the internal resistance of the battery core is higher. The $m_1 w/\alpha$ of Comparative Example 4 is less than 0.5, and the $m_1 w/\alpha$ of Comparative Example 5 is greater than 20, and compared with Examples 1-4, more electrolytic solutions are decomposed after 500 cycles, the content of the remaining lithium salt in the electrolytic solution is relatively low, and the internal resistance of the battery core is relatively high in Comparative Examples 4 and 5.

TABLE 2

| No. | tab cross-sectional area S/mm² | battery core capacity C/A.h | α | LiFSI concentration/ % w | LiSO₃F content/ % m₁ | m₁w/α | percentage of remaining centrifuged electrolytic solution after 500cls | remaining lithium salt content in centrifuged electrolytic solution after 500 cls | internal resistance of battery core after 500 cls mΩ | energy density Wh/L |
|---|---|---|---|---|---|---|---|---|---|---|
| Comparative Example 6 | 234.57 | 280 | 1.83 | 12 | 0.4 | 2.626 | 84.5% | 85.7% | 0.530 | 498.3 |
| Comparative Example 7 | 17.28 | 410 | 9.86 | 12 | 0.4 | 0.487 | 76.1% | 82.5% | 0.581 | 581.4 |
| Example 5 | 9.6 | 280 | 9.04 | 12 | 0.4 | 0.531 | 83.7% | 85.1% | 0.571 | 578.7 |
| Example 6 | 156.38 | 280 | 2.24 | 12 | 0.4 | 2.144 | 84.1% | 86.0% | 0.559 | 541.2 |

From Table 2, it can be seen that the $m_1w/\alpha$ of Comparative Example 7 is less than 0.5, and the temperature rise coefficient of Comparative Example 6 is smaller than 2, and compared with Examples 5 and 6, more electrolytic solutions are decomposed after 500 cycles, the content of the remaining lithium salt in the electrolytic solution is relatively low, and the internal resistance of the battery core is relatively high in Comparative Examples 6 and 7.

TABLE 3

| No. | tab cross-sectional area S/mm² | battery core capacity C/A.h | α | LiFSI concentration/ % w | LiSO₃F content/ % m₁ | m₁w/α | type of fluorinated solvent | addition amount/ % of fluorinated solvent m₂ | m₂/α | percentage of remaining centrifuged electrolytic solution after 500 cls | remaining lithium salt content in centrifuged electrolytic solution after 500 cls | internal resistance of battery core after 500 cls mΩ |
|---|---|---|---|---|---|---|---|---|---|---|---|---|
| Comparative Example 8 | 24.96 | 280 | 5.60 | 18 | 2 | 6.4 | / | / | / | 86.0% | 87.9% | 0.499 |
| Comparative Example 9 | 24.96 | 280 | 5.60 | 18 | 2 | 6.423 | trifluoroethyl methyl carbonate | 3 | 0.54 | 86.6% | 89.5% | 0.485 |
| Example 7 | 24.96 | 280 | 5.60 | 18 | 2 | 6.423 | trifluoroethyl methyl carbonate | 6 | 1.07 | 87.5% | 90.1% | 0.474 |
| Example 8 | 24.96 | 280 | 5.60 | 18 | 2 | 6.423 | trifluoroethyl methyl carbonate | 45 | 8.03 | 87.6% | 90.7% | 0.471 |
| Comparative Example 10 | 24.96 | 280 | 5.60 | 18 | 2 | 6.423 | trifluoroethyl methyl carbonate | 60 | 10.71 | 87.9% | 91.4% | 0.483 |
| Example 9 | 24.96 | 280 | 5.60 | 18 | 2 | 6.423 | fluorobenzene | 6 | 1.07 | 87.3% | 90.0% | 0.475 |
| Example 10 | 24.96 | 280 | 5.60 | 18 | 2 | 6.423 | difluoroethylene carbonate | 6 | 1.07 | 87.4% | 90.0% | 0.474 |
| Example 11 | 24.96 | 280 | 5.60 | 18 | 2 | 6.423 | fluoroether of formula 1 | 6 | 1.07 | 87.3% | 90.0% | 0.476 |
| Example 12 | 24.96 | 280 | 5.60 | 18 | 2 | 6.423 | trifluoroethyl methyl carbonate/ difluoroethylene carbonate/ fluorobenzene = 3/1/1 (mass ratio) | 6 | 1.07 | 87.6% | 90.2% | 0.470 |

From Table 3, it can be seen that the $m_2/\alpha$ of Comparative Example 9 is smaller than 1, the $m_2/\alpha$ of Comparative Example 10 is greater than 10, and the $m_2/\alpha$ of Examples 7 and 8 is 1%~8% (after rounding). Compared with Examples 7 and 8, the internal resistance of the battery core is slightly high after 500 cycles in Comparative Examples 9 and 10.

TABLE 4

| No. | tab cross-sectional area S/mm² | battery core capacity C/A.h | α | LiFSI concentration/ % w | LiSO₃F content/ % m₁ | m₁w/α | percentage of remaining centrifuged electrolytic solution after 500 cls | remaining lithium salt content in centrifuged electrolytic solution after 500 cls | internal resistance of battery core after 500 cls mΩ | type of additive prone to lose electrons | content of additive prone to lose electrons/ % m₃ | m₃/α |
|---|---|---|---|---|---|---|---|---|---|---|---|---|
| Comparative Example 11 | 24.96 | 280 | 5.60 | 18 | 2 | 6.423 | 86.0% | 87.9% | 0.499 | / | 0 | 0 |
| Comparative Example 12 | 24.96 | 280 | 5.60 | 18 | 2 | 6.423 | 86.7% | 90.3% | 0.470 | additive 1 | 0.2 | 0.036 |
| Example 13 | 24.96 | 280 | 5.60 | 18 | 2 | 6.423 | 87.4% | 90.2% | 0.466 | additive 1 | 0.57 | 0.102 |
| Example 14 | 24.96 | 280 | 5.60 | 18 | 2 | 6.423 | 86.6% | 89.6% | 0.461 | additive 1 | 5 | 0.892 |
| Example 15 | 24.96 | 280 | 5.60 | 18 | 2 | 6.423 | 87.7% | 91.2% | 0.454 | additive 1 | 4.5 | 0.803 |
| Example 16 | 24.96 | 280 | 5.60 | 18 | 2 | 6.423 | 87.4% | 90.3% | 0.464 | additive 2 | 1.2 | 0.214 |
| Example 17 | 24.96 | 280 | 5.60 | 18 | 2 | 6.423 | 87.5% | 90.5% | 0.463 | additive 3 | 1.2 | 0.214 |
| Example 18 | 24.96 | 280 | 5.60 | 18 | 2 | 6.423 | 87.4% | 90.3% | 0.464 | additive 4 | 1.2 | 0.214 |
| Example 19 | 24.96 | 280 | 5.60 | 18 | 2 | 6.423 | 87.3% | 90.0% | 0.468 | additive 5 | 1.2 | 0.214 |

From Table 4, it can be seen that the additive prone to lose electrons is not added to the electrolytic solution of Comparative Example 11, and compared with Comparative Example 12 and Examples 13-19, more electrolytic solutions are decomposed after 500 cycles, the content of lithium salt remaining in the electrolytic solution is relatively low, and the internal resistance of the battery core is higher in Comparative Example 11. The $m_3/a$ of Comparative Example 12 is less than 0.1%, and the internal resistance of the battery core after 500 cycles is higher in Comparative Example 12 than in Example 13.

It should be noted that the present disclosure is not limited to the above embodiments. The above embodiments are merely exemplary, and embodiments having substantially the same configuration as the technical idea and exerting the same effects within the scope of the technical solutions of the present disclosure are all included in the technical scope of the present disclosure. In addition, in the scope without departing from the gist of the present disclosure, other modes constructed by applying various modifications that can be conceived by those skilled in the art to the embodiment, and combining some of the constituent elements of the embodiments are also included in the scope of the present disclosure.

What is claimed is:

1. A secondary battery, comprising an electrode assembly and an electrolytic solution, the electrode assembly comprising a positive electrode plate, a negative electrode plate, and a separator, the positive electrode plate comprising a positive electrode tab, and the negative electrode plate comprising a negative electrode tab, wherein the positive electrode tab has a following temperature rise coefficient α A.h/mm:

$$\alpha = \frac{C}{10\sqrt{S1}}$$

where S1 is a total cross-sectional area of the positive electrode tab, in unit of mm²; C is capacity of the electrode assembly, in unit of Ah, wherein α is from 2 to 9.5;

the electrolytic solution contains a heat stable salt and an additive that inhibits decomposition of lithium salt, wherein the heat stable salt has a following molecular formula:

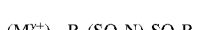

wherein

M^{p+} is one or more selected from the group consisting of $Li^+$, $Na^+$, $K^+$, $Rb^+$, $Cs^+$, $Mg^{2+}$, $Ca^{2+}$, $Ba^{2+}$, $Al^{3+}$, $Fe^{2+}$, $Fe^{3+}$, $Ni^{2+}$, and $Ni^{3+}$, optionally, $M^{p+}$ is one or more selected from the group consisting of $Li^+$, $K^+$, $Cs^+$, and $Ba^{2+}$, and y is valence of the M, the $R_1$ and $R_2$ are each independently selected from the group consisting of fluorine atom, fluoroalkyl having 1~20 carbon atoms, fluoroalkoxy having 1~20 carbon atoms, and alkyl having 1~20 carbon atoms, x is an integer selected from the group consisting of 1, 2, and 3, by mass percentage, a content of the heat stable salt in the electrolytic solution is w %, wherein w % is from 8% to 30%, the additive that inhibits decomposition of lithium salt is one or more of $RSO_3F$, where R is one or more selected from the group consisting of $Li^+$, $Na^+$, $K^+$, $Rb^+$, and $Cs^+$, by mass percentage, a content of the additive that inhibits decomposition of lithium salt in the electrolytic solution is $m_1$%, wherein $m_1$% is from 0.1% to 5%, and w, $m_1$, and α satisfy $0.5<m_1 w/\alpha<20$.

2. The secondary battery according to claim 1, wherein the heat stable salt has a temperature corresponding to 5% weight loss rate higher than 200° C.

3. The secondary battery according to claim 1, wherein in the molecular formula of the heat stable salt, x=1 and y=1, or x=1 and y=2, or x=2 and y=1.

4. The secondary battery according to claim 1, wherein in the molecular formula of the heat stable salt, $R_1$ and $R_2$ are each independently selected from fluorine atom and trifluoromethyl; and optionally, $R_1$ and $R_2$ are both fluorine atom or both trifluoromethyl.

5. The secondary battery according to claim 1, wherein the heat stable salt is one or more selected from the group consisting of: lithium bisfluorosulfonyl imide, potassium bisfluorosulfonyl imide, cesium bisfluorosulfonyl imide, barium bisfluorosulfonyl imide, lithium bistrifluoromethanesulfonyl imide, $Li_2F(SO_2N)_2SO_2F$, and $LiCF_3SO_2NSO_2F$.

6. The secondary battery according to claim 1, wherein the additive that inhibits decomposition of lithium salt is one or more of $LiSO_3F$, $NaSO_3F$, or $KSO_3F$.

7. The secondary battery according to claim 1, wherein the electrolytic solution further contains a fluorinated solvent, and the fluorinated solvent is one or more selected from the group consisting of fluorinated carbonate, fluorobenzene, and fluoroether.

8. The secondary battery according to claim 7, wherein a content of the fluorinated solvent in the electrolytic solution is $m_2$%, $m_2$% is from 3% to 60%, and a ratio $m_2/\alpha$ of $m_2$ to α is 1~8.

9. The secondary battery according to claim 7, wherein the fluorinated carbonate is

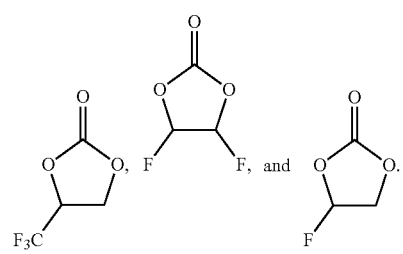

and/or, the fluorobenzene is

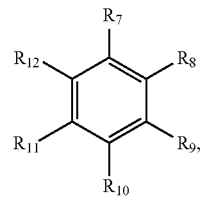

and/or, the fluoroether is $R_{1'}$—O—$R_{2'}$, where $R_3$, $R_4$, $R_5$, $R_6$, $R_{1'}$, and $R_{2'}$ are each independently —$C_{x'}F_{y'}H_{z'}$—, $1 \leq x' \leq 6$, $y'>0$, $z'>0$, and $0 \leq y' \leq 2x'$, $0 \leq z' \leq 2x'$, and $R_7$, $R_8$, $R_9$, $R_{10}$, $R_{11}$, and $R_{12}$ are each independently one of F or H.

10. The secondary battery according to claim 9, wherein $R_{1'}$ and $R_{2'}$ are each independently selected from a group consisting of —$C_2F_4H$, —$CF_3$, —$C_3F_6H$, —$C_2F_3H_2$, and —$C_3F_4H_3$;

optionally, $R_{1'}$ and $R_{2'}$ are each independently selected from the group consisting of —$CF_2$—$CF_2H$, —$CF_3$, —$CF_2$—CFH—$CF_3$, —$CH_2$—$CF_3$, and —$CH_2$—$CF_2$—$CHF_2$; and optionally, the fluoroether is selected from following structures:

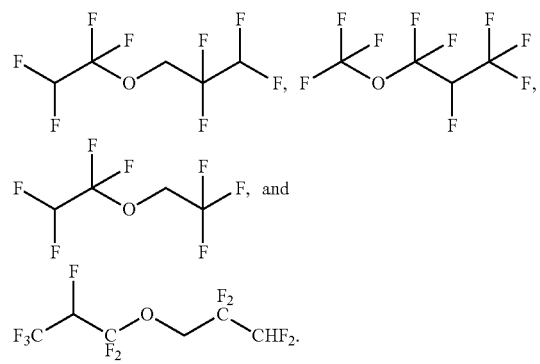

11. The secondary battery according to claim 9, wherein $R_5$ and $R_6$ are each independently selected from a group consisting of —$C_2F_3H$, —CFH, and —$CH_2$;

optionally, $R_5$ and $R_6$ are each independently selected from the group consisting of —CH—$CF_3$, —CHF, and —$CH_2$; and optionally, the fluorinated carbonate is selected from the group consisting of:

12. The secondary battery according to claim 9, wherein $R_5$ and $R_6$ are each independently selected from a group consisting of —$CH_3$, —$C_2F_3H_2$, —$CFH_2$, and —$C_2FH_4$;
   optionally, $R_5$ and $R_6$ are each independently selected from the group consisting of —$CH_3$, —$CH_2$—$CF_3$, —$CH_2$—F, and —$CH_2$—$CH_2$—F; and
   optionally, the fluorinated carbonate is selected from the group consisting of:

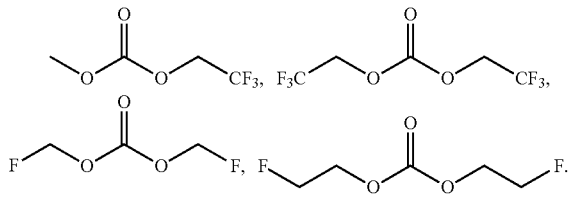

13. The secondary battery according to claim 1, wherein the electrolytic solution further contains an additive prone to lose electrons, and the additive prone to lose electrons is one or more selected from the group consisting of phosphite, borate, and phosphate.

14. The secondary battery according to claim 13, wherein a content of the additive prone to lose electrons in the electrolytic solution is $m_3$%, $m_3$% is from 0.5% to 1.2%, and a ratio $m_3/\alpha$ of $m_3$ to $\alpha$ is 0.1~0.9.

15. The secondary battery according to claim 13, wherein the phosphite is

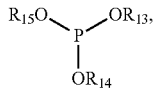

and/or, the phosphate is

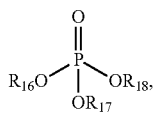

and/or, the borate is

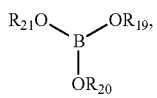

where $R_{13}$, $R_{14}$, $R_{15}$, $R_{16}$, $R_{17}$, $R_{18}$, $R_{19}$, $R_{20}$, and $R_{21}$ are each independently selected from the group consisting of: alkyl, fluoroalkyl, silyl, alkenyl, and phenyl.

16. The secondary battery according to claim 15, wherein $R_{13}$, $R_{14}$, and $R_{15}$ are each independently selected from the group consisting of $C_{1-6}$ alkyl (e.g., methyl, ethyl) and $C_{1-6}$ fluoroalkyl (e.g., fluoromethyl, fluoroethyl, e.g., —$CH_2$—$CF_3$); and
   optionally, the phosphite is selected from

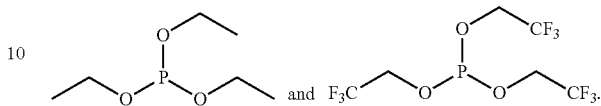

17. The secondary battery according to claim 15, wherein $R_{16}$, $R_{17}$, and $R_{18}$ are each independently selected from $C_{1-6}$ fluoroalkyl (e.g., fluoromethyl, fluoroethyl, e.g., —$CH_2$—$CF_3$) and $C_{1-6}$ alkenyl (e.g., allyl); and
   optionally, the phosphate is selected from:

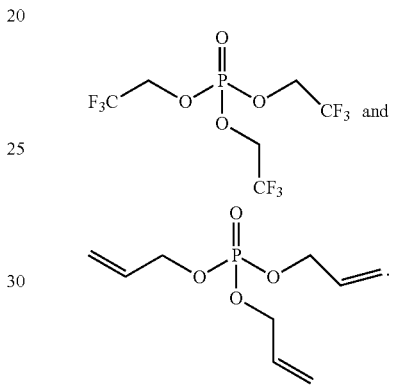

18. The secondary battery according to claim 15, wherein $R_{19}$, $R_{20}$, and $R_{21}$ are each independently selected from the group consisting of $C_{1-6}$ alkyl (e.g., methyl, ethyl) and $C_{1-6}$ fluoroalkyl (e.g., fluoromethyl, fluoroethyl, e.g., —$CH_2$—$CF_3$); and
   optionally, the borate is selected from

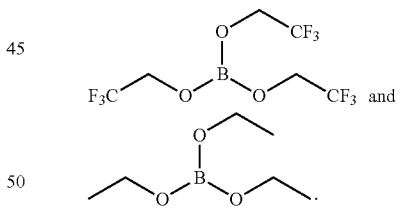

19. A battery module, comprising the secondary battery according to claim 1.

* * * * *